(12) United States Patent
Ishikawa et al.

(10) Patent No.: US 12,103,372 B2
(45) Date of Patent: Oct. 1, 2024

(54) DRIVE DEVICE AND VEHICLE

(71) Applicant: NIDEC CORPORATION, Kyoto (JP)

(72) Inventors: Yuki Ishikawa, Kyoto (JP); Hitoshi Kuroyanagi, Kyoto (JP)

(73) Assignee: NIDEC CORPORATION, Kyoto (JP)

( * ) Notice: Subject to any disclaimer, the term of this patent is extended or adjusted under 35 U.S.C. 154(b) by 387 days.

(21) Appl. No.: 17/694,690

(22) Filed: Mar. 15, 2022

(65) Prior Publication Data
US 2022/0305892 A1    Sep. 29, 2022

(30) Foreign Application Priority Data

Mar. 25, 2021  (JP) .................................. 2021-052276

(51) Int. Cl.
*B60K 1/00*      (2006.01)
*H02K 9/19*      (2006.01)

(52) U.S. Cl.
CPC ................ *B60K 1/00* (2013.01); *H02K 9/19* (2013.01); *B60K 2001/001* (2013.01); *B60K 2001/006* (2013.01)

(58) Field of Classification Search
CPC .... B60K 1/00; B60K 11/02; B60K 2001/001; B60K 2001/006; B60K 2001/003; H02K 9/19; H02K 9/197; H02K 9/193; H02K 9/26; H02K 1/32; H02K 5/161; H02K 7/10; H02K 7/116; H02K 11/04
See application file for complete search history.

(56) References Cited

U.S. PATENT DOCUMENTS

| | | | | |
|---|---|---|---|---|
| 7,102,260 B2 * | 9/2006 | Takenaka | ................. | H02K 5/18 |
| | | | | 310/52 |
| 7,775,060 B2 * | 8/2010 | Nakajima | ................. | B60L 1/02 |
| | | | | 62/505 |
| 9,847,698 B2 | 12/2017 | Yoshinori et al. | | |
| 10,879,769 B2 * | 12/2020 | Ishikawa | ................. | H02K 9/19 |
| 11,777,364 B2 * | 10/2023 | Ishikawa | ............... | H02K 11/33 |
| | | | | 310/54 |
| 2019/0334448 A1 * | 10/2019 | Ishikawa | ................. | H02K 11/33 |

FOREIGN PATENT DOCUMENTS

| | | | | |
|---|---|---|---|---|
| JP | 2020174478 A | 10/2020 | | |
| WO | WO-2013069774 A1 * | 5/2013 | ............... | B60K 1/00 |
| WO | WO-2014045707 A1 * | 3/2014 | .......... | B60L 11/1803 |
| WO | WO-2019098166 A1 * | 5/2019 | ............ | F16H 57/04 |
| WO | WO-2019208096 A1 * | 10/2019 | | |
| WO | WO-2019216043 A1 * | 11/2019 | | |

* cited by examiner

*Primary Examiner* — Steve Clemmons
(74) *Attorney, Agent, or Firm* — HAUPTMAN HAM, LLP

(57) ABSTRACT

In a drive device, a housing includes a motor accommodation portion for accommodating a motor and an inverter accommodation portion for accommodating an inverter unit, the motor accommodation portion includes a tubular portion of a tubular shape extending in a first direction, the inverter accommodation portion includes a peripheral wall portion surrounding the inverter accommodation portion when viewed from a second direction and a plate portion extending from the tubular portion along one side in a direction perpendicular to the first direction and intersecting the second direction and continuous with the peripheral wall portion, and at least one of the pump and the oil cooler is fixed to the plate portion.

5 Claims, 11 Drawing Sheets

DRIVE DEVICE AND VEHICLE

CROSS-REFERENCE TO RELATED APPLICATIONS

The present invention claims priority under 35 U.S.C. § 119 to Japanese Patent Application No. 2021-052276 filed on Mar. 25, 2021, the entire content of which is incorporated herein by reference.

FIELD OF THE INVENTION

The present invention relates to a drive device and a vehicle.

BACKGROUND

Conventionally, an electric motor mounted on a vehicle or the like is cooled by supply of a refrigerant such as cooled oil. For example, the refrigerant is supplied from a pump disposed outside the electric motor.

For example, in the conventional technology, there is a possibility that the drive device increases in size and becomes difficult to dispose inside the vehicle depending on disposition of a pump.

SUMMARY

An exemplary drive device of the present invention includes a motor that includes a rotor having a motor shaft rotatable about a rotation axis extending along a first direction, and a stator located radially outward of the rotor, an inverter unit that supplies drive power to the motor, a housing that accommodates the motor and the inverter unit, a pump that supplies oil accommodated in the housing to the motor, and an oil cooler that cools the oil. The housing includes a motor accommodation portion that accommodates the motor and an inverter accommodation portion that accommodates the inverter unit. The motor accommodation portion includes a tubular portion of a tubular shape extending in the first direction. The inverter accommodation portion includes a peripheral wall portion surrounding the inverter unit when viewed from a second direction perpendicular to the first direction, and a plate portion extending from the tubular portion along one side in a direction perpendicular to the first direction and intersecting the second direction and continuous with the peripheral wall portion. At least one of the pump and the oil cooler is fixed to the plate portion.

An exemplary vehicle of the present invention includes the drive device described above.

The above and other elements, features, steps, characteristics and advantages of the present disclosure will become more apparent from the following detailed description of the preferred embodiments with reference to the attached drawings.

DETAILED DESCRIPTION

Figure 1:
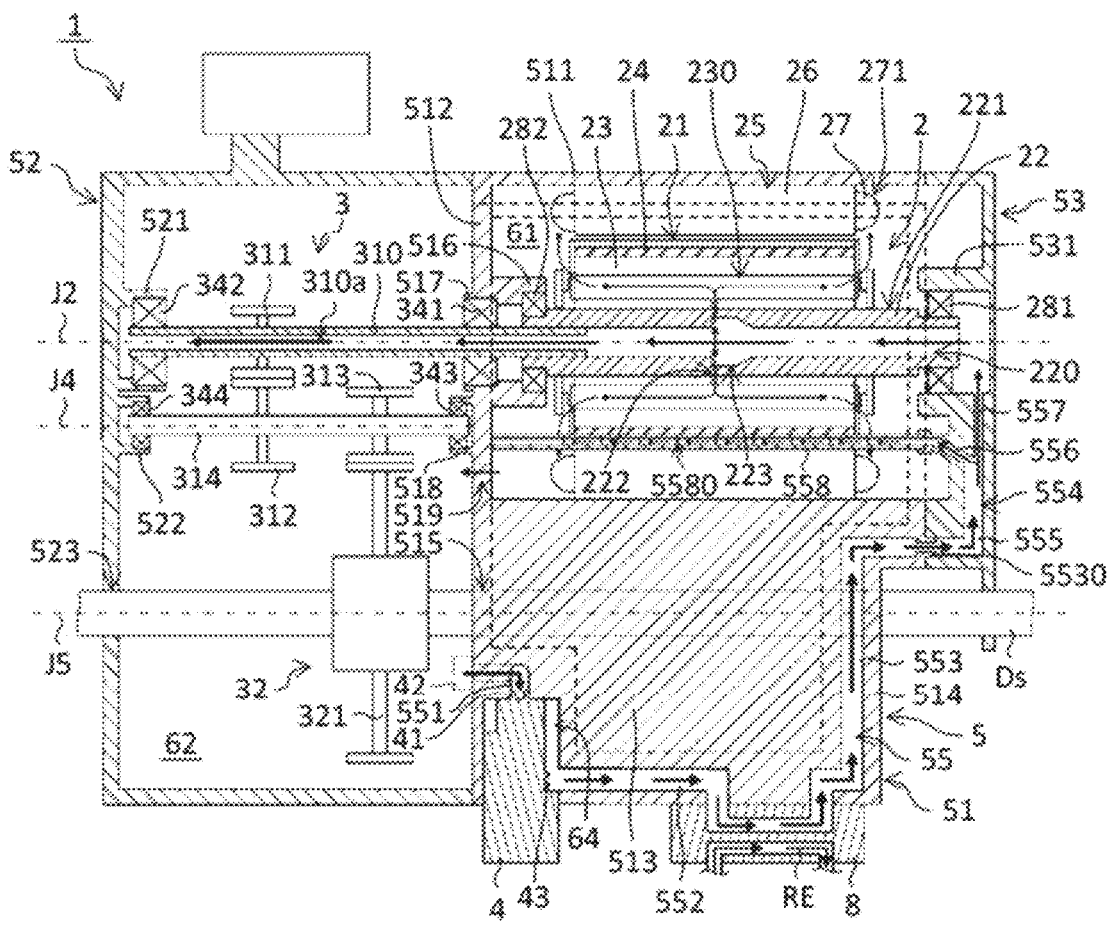
FIG. 1 is a schematic configuration view of a drive device viewed from a vertical direction.
Figure 1:
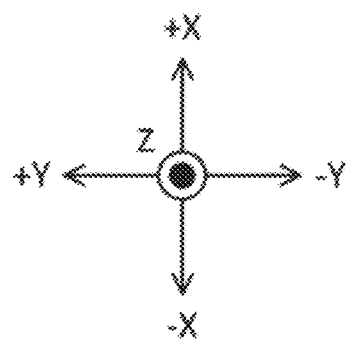

Hereinafter, exemplary embodiments will be described with reference to the drawings.

The following description will be made with the direction of gravity being partitioned based on a positional relationship in the case where a drive device 1 is mounted in a vehicle located on a horizontal road surface. In addition, in the drawings, an XYZ coordinate system is shown appropriately as a three-dimensional orthogonal coordinate system. In the XYZ coordinate system, the Z axis direction indicates the vertical direction (i.e., up-down direction). The +Z direction is upward (vertically upward opposite to the gravity direction), and the −Z direction is downward (vertically downward in the same direction as the gravity direction). In each component, an end portion upward is referred to as an "upper end portion", and the position of the upper end portion in the axial direction is referred to as an "upper end". An end portion downward is referred to as a "lower end portion", and the position of the lower end portion in the axial direction is referred to as a "lower end". Among surfaces of each component, a surface facing the upper side is referred to as an "upper surface", and a surface facing the lower side is referred to as a "lower surface".

In addition, an X axis direction corresponds to a front-rear direction of the vehicle in which the drive device 1 is installed, and is a direction perpendicular to the Z axis direction, and a +X direction points forward of the vehicle, while a −X direction points rearward of the vehicle. Note, however, the +X direction and the −X direction may point rearward and forward, respectively, of the vehicle.

The Y axis direction is a direction orthogonal to both the X axis direction and the Z axis direction and indicates the width direction (right-left direction) of the vehicle. The +Y direction is the left of the vehicle, and the −Y direction is the right of the vehicle. However, when the +X direction is the rear of the vehicle, the +Y direction can be the right of the vehicle, and the −Y direction can be the left of the vehicle. That is, regardless of the X axis direction, the +Y direction simply becomes one side in the right-left direction of the vehicle, and the −Y direction becomes the other side in the right-left direction of the vehicle. Depending on a method for mounting the drive device 1 on the vehicle, the X axis direction can be the width direction (right-left direction) of the vehicle, and the Y axis direction can be the front-rear direction of the vehicle. In the following embodiment, the Y axis direction is parallel to, for example, a rotation axis J2 of a motor 2. Therefore, the Y axis direction is sometimes simply referred to as an "axial direction".

Unless otherwise specified in the following description, the direction (Y axis direction) parallel to a predetermined axis such as the rotation axis J2 of the motor 2 is sometimes simply referred to as an "axial direction". Furthermore, a direction orthogonal to a predetermined axis is simply referred to as a "radial direction", and a circumferential direction about a predetermined axis is referred to as a "circumferential direction". Of the radial direction, an orientation approaching an axis is referred to as "radially inward", and an orientation separating from the axis is referred to as "radially outward". In each component, an end portion radially inward is referred to as a "radially inner end portion". Furthermore, an end portion outward is referred to as a "radially outer end portion". Of the side surface of each component, a side surface facing radially inward is referred to as "radial inward surface", and a side surface facing radially outward is referred to as "radial outward surface".

In each component, an end portion in the circumferential direction is referred to as a "circumferential end portion". The position of a circumferential end portion in the circumferential direction is referred to as a "circumferential end". An end portion in one circumferential direction is referred to as "one circumferential end portion". Furthermore, an end portion in the other circumferential direction is referred to as "the other circumferential end portion". In addition, of the side surface of each component, a side surface facing the circumferential direction is referred to as a "circumferential side surface". Furthermore, the side surface facing the one circumferential side is referred to as "one circumferential side surface", and the side surface facing the other circumferential side is referred to as "the other circumferential side surface".

In a positional relationship between any one and another of the azimuth, the line, and the surface, "parallel" includes not only a state in which the two endlessly extend without intersecting at all but also a state in which the two are substantially parallel. Further, "orthogonal" and "perpendicular" include not only a state where the two intersect each other at 90 degrees, but also a state where the two are substantially orthogonal and a state where the two are substantially perpendicular. That is, the terms "parallel", "perpendicular", and "orthogonal" each include a state in which the positional relationship between both has an angular deviation that does not depart from the gist of the present invention.

Note that these are names used merely for description, and are not intended to limit actual positional relationships, directions, names, and the like.

Figure 2:
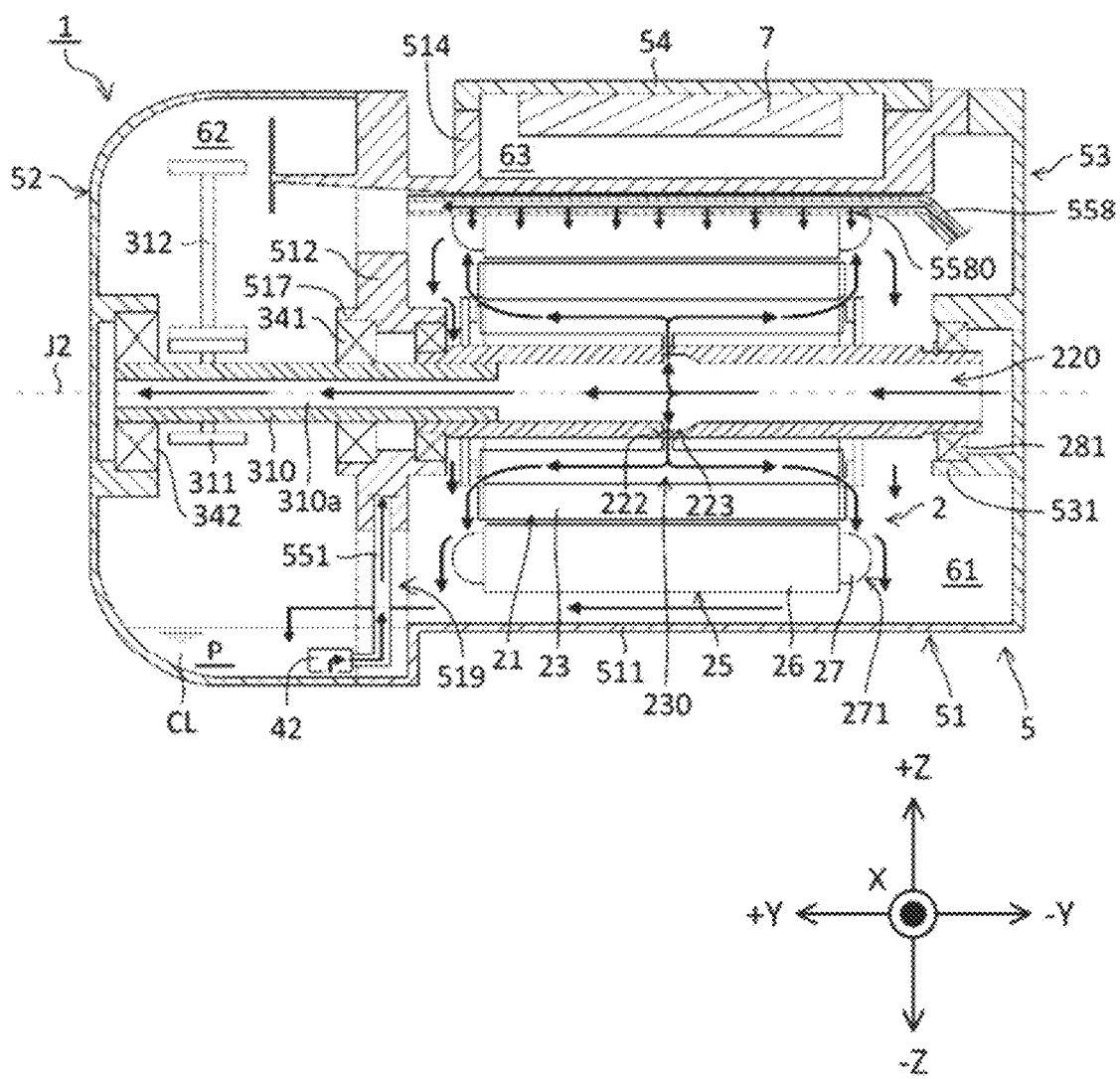
FIG. 2 is a schematic configuration view of the drive device viewed from an X axis direction.
Figure 3:
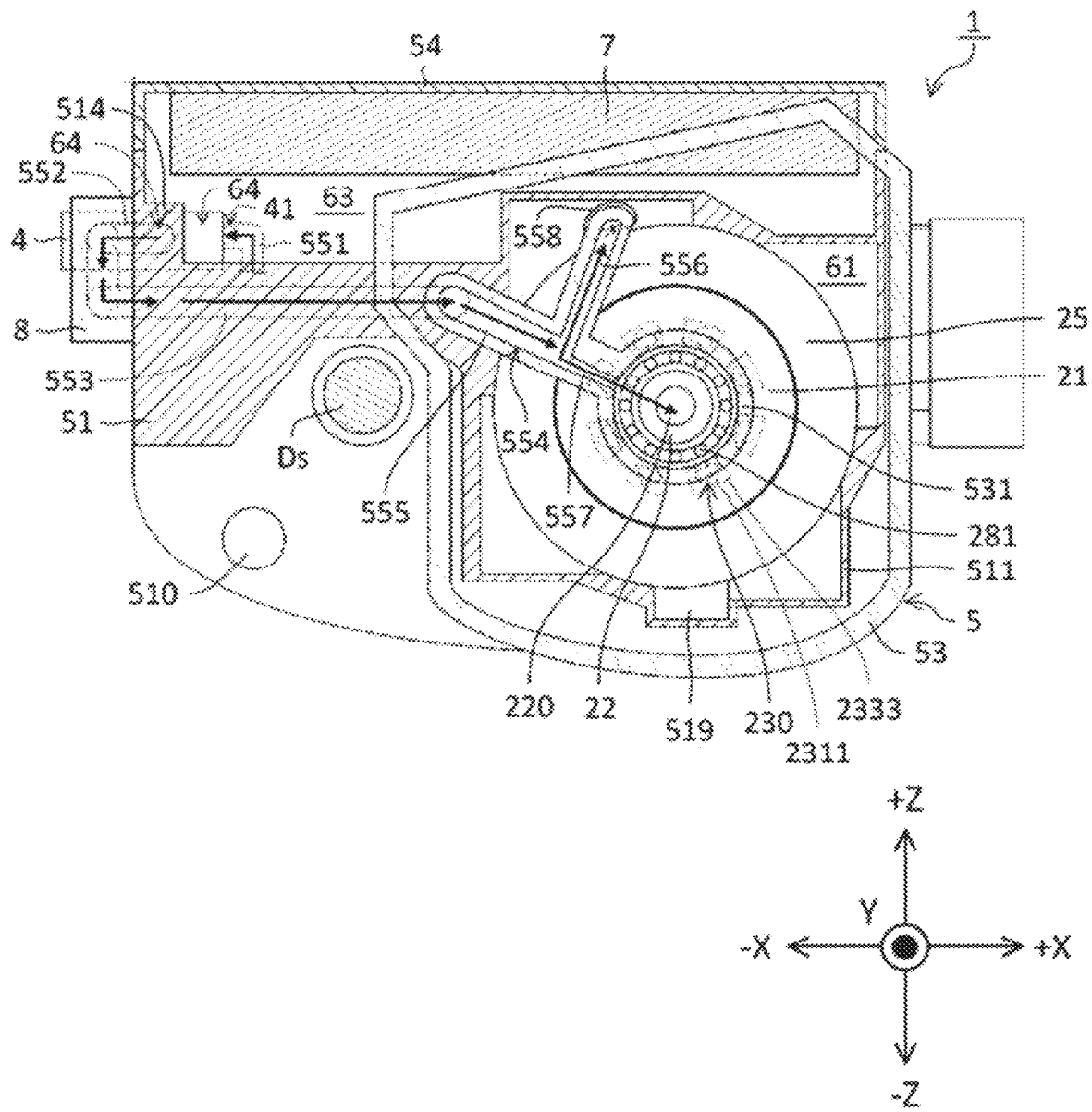
FIG. 3 is a schematic configuration view of the drive device viewed from a Y axis direction.
Figure 4:
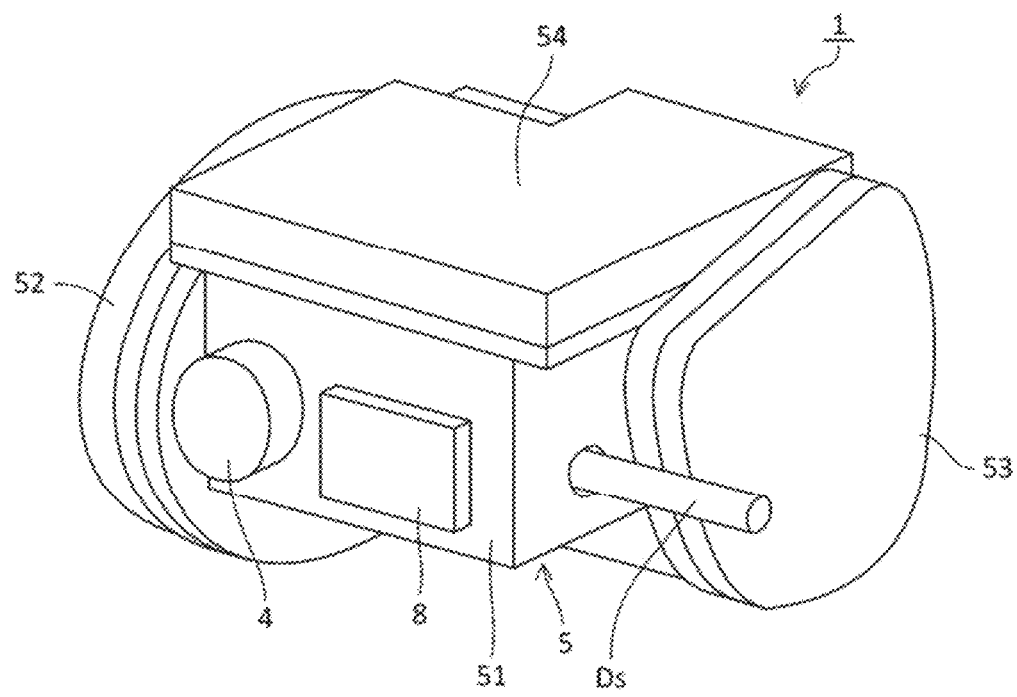
FIG. 4 is a perspective view of the drive device.
Figure 4:
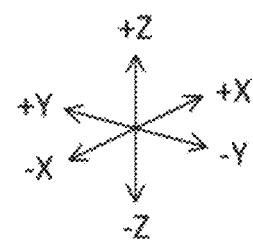

The drive device 1 according to an exemplary embodiment of the present invention will be described below with reference to the drawings. FIGS. 1 to 3 are conceptual views of the drive device 1 according to an embodiment. FIG. 1 is a schematic configuration view of the drive device 1 viewed from the vertical direction. FIG. 2 is a schematic configuration view of the drive device 1 viewed from the X axis direction. FIG. 3 is a schematic configuration view of the drive device 1 viewed from the Y axis direction. FIG. 4 is a perspective view of the drive device 1. Note that FIGS. 1 to 3 are merely conceptual views, and the layout and dimensions of each portion are not necessarily the same as those of the actual drive device 1.

The drive device 1 is mounted on the vehicle such as a hybrid vehicle (HV), a plug-in hybrid vehicle (PHV), and an electric vehicle (EV) in which at least the motor is used as a power source. The drive device 1 is used as the power source of the above-described vehicle.

As illustrated in FIG. 1, the drive device 1 includes the motor 2, a gear portion 3, a pump 4, a housing 5, and an oil cooler 8. As illustrated in FIG. 1, the motor 2 has a motor shaft 22. The motor shaft 22 is rotatable about the rotation axis J2 extending along the horizontal direction. The gear portion 3 is connected to one axial end portion (+Y side end portion) of the motor shaft 22. The housing 5 accommodates the motor 2, the gear portion 3, and an inverter unit 7. The pump 4 supplies an oil CL accommodated in the housing 5 to the motor 2. The oil cooler 8 cools the oil CL. The oil cooler 8 cools the oil CL supplied from the pump 4 to the motor 2 in the present embodiment. The drive device 1 further includes an inverter unit 7. The inverter unit 7 supplies drive electric power to the motor 2.

The inside of the housing 5 is provided with an accommodation space that accommodates the motor 2, the gear portion 3, and the inverter unit 7. As described later, this accommodation space is partitioned into a motor accommodation portion 61 that accommodates the motor 2, a gear accommodation portion 62 that accommodates the gear portion 3, an inverter accommodation portion 63 that accommodates the inverter unit 7, and a pump accommodation portion 64 that accommodates the pump 4. The inverter unit 7 is integrally attached to a fourth housing member 54 described later.

The motor 2 is accommodated in the motor accommodation portion 61 of the housing 5. The motor 2 includes a rotor 21 and a stator 25. The rotor 21 is fixed to the radially outer surface of the motor shaft 22. The stator 25 rotationally drives the rotor 21.

When electric power is supplied from a battery (not illustrated) to the stator 25, the rotor 21 rotates about the rotation axis J2 extending in the horizontal direction. The rotor 21 includes a motor shaft 22, a rotor core 23, and a rotor magnet 24. The rotor core 23 is fixed to the radial outside surface of the motor shaft 22.

The motor shaft 22 extends about the rotation axis J2 extending in the Y axis direction. The motor shaft 22 rotates about the rotation axis J2. The motor shaft 22 is rotatably supported by a first motor bearing 281 and a second motor bearing 282. The first motor bearing 281 is held by a third housing member 53 of the housing 5 described later. The second motor bearing 282 is held by a side plate portion 512 of the housing 5 described later.

The motor shaft 22 is a tubular hollow shaft. The motor shaft 22 includes a hollow portion 220, a shaft tubular portion 221 extending in the axial direction, and a shaft hole portion 222. The hollow portion 220 is disposed inside the shaft tubular portion 221. The shaft hole portion 222 penetrates the shaft tubular portion 221 in the radial direction. The motor shaft 22 further includes a recess 223. The recess 223 is disposed on the inner peripheral surface of the shaft tubular portion 221 at the central portion of the rotation axis J2, is recessed radially outward from this inner peripheral surface, and extends in the circumferential direction. The shaft hole portion 222 is disposed in the bottom surface of the recess 223 and penetrates the shaft tubular portion 221 radially outward from the bottom surface of the recess 223.

A hollow transmission shaft 310 of the gear portion 3 described later is inserted and connected to one end portion (+Y side) of the motor shaft 22. It is possible to adopt a screw coupling using a male screw and a female screw for connecting the both. Alternatively, the both may be joined by a fixing method such as welding. The hollow portion 220 of the motor shaft 22 communicates with a hollow portion 310a of the transmission shaft 310 described later and a first motor bearing holding portion 531 that accommodates the first motor bearing 281.

The rotor core 23 is a columnar body extending along the axial direction. The rotor core 23 is disposed on the radially outer surface of the motor shaft 22. As mentioned earlier, the rotor 21 has the rotor core 23. A plurality of rotor magnets 24 are fixed to the rotor core 23. The plurality of rotor magnets 24 are aligned along the circumferential direction with the magnetic poles arranged alternately.

The rotor core 23 includes a rotor through hole 230 and a rotor space 2334. The rotor through hole 230 penetrates the rotor core 23 in the axial direction (i.e., the Y axis direction). The rotor space 2334 connects the rotor through hole 230 and the shaft hole portion 222 of the motor shaft 22. The rotor through hole 230 is used as a circulation path for the oil CL that cools the rotor 21 from inside. The oil CL circulating through the hollow portion 220 of the motor shaft 22 can flow into the rotor through hole 230 via the shaft hole portion 222 and the rotor space 2334 as described later.

Figure 5:
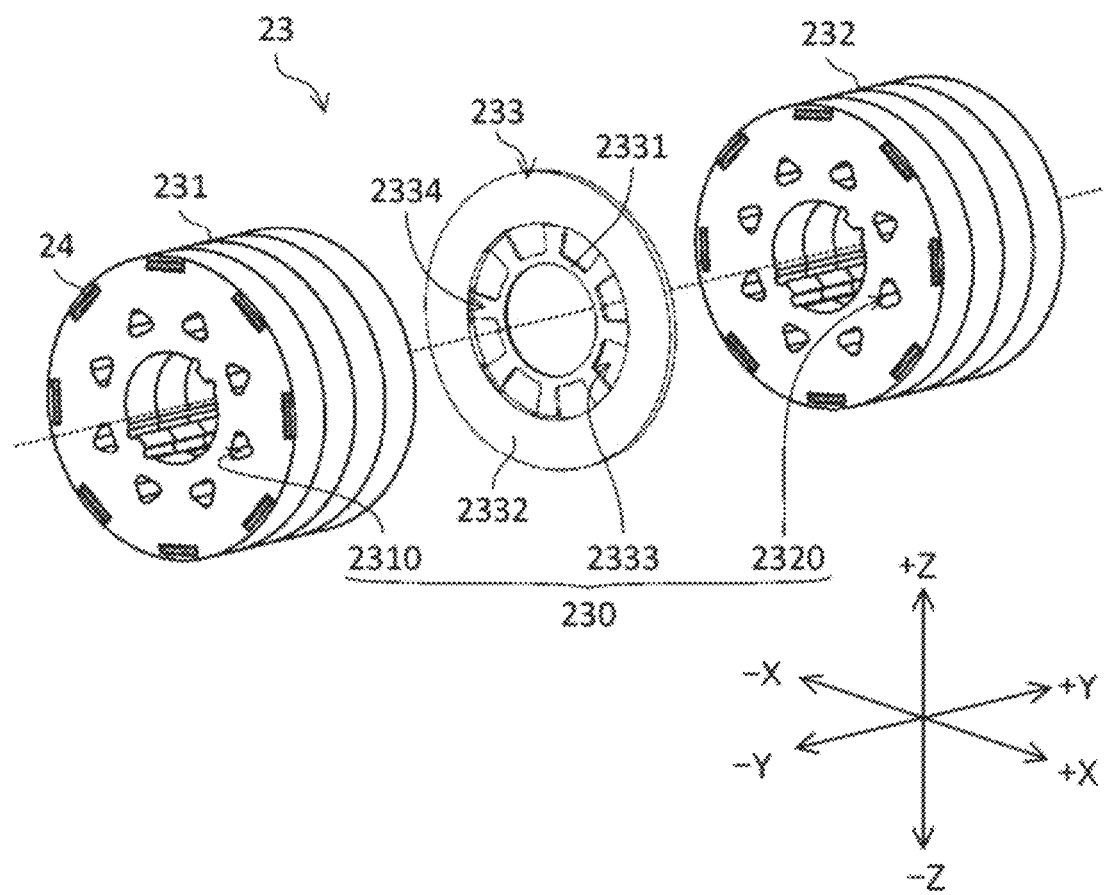
FIG. 5 is a perspective view illustrating a configuration example of a rotor core.

FIG. 5 is a perspective view illustrating a configuration example of the rotor core 23. The rotor core 23 includes a first rotor core 231, a second rotor core 232, and an intermediate core 233. The first rotor core 231 has a first rotor through hole 2310 extending in the axial direction. The second rotor core 232 has a second rotor through hole 2320 extending in the axial direction. The intermediate core 233 is disposed between the first rotor core 231 and the second rotor core 232 in the axial direction. The first rotor core 231 and the second rotor core 232 are stacked bodies formed of stacked silicon steel plates. The intermediate core 233 is a silicon steel plate stacked between the first rotor core 231 and the second rotor core 232.

The intermediate core 233 includes a first annular portion 2331 of an annular shape, a second annular portion 2332 of an annular shape, and a core opening 2333. The first annular portion 2331 is disposed radially outward of the motor shaft 22. The second annular portion 2332 extends radially outward from the radially outer end portion of the first annular portion 2331. The core opening 2333 penetrates the first annular portion 2331 in the axial direction. In the present embodiment, a plurality of the core openings 2333 are disposed in the circumferential direction along the radially inner end portion of the first annular portion 2331.

In the axial direction, the thickness of the second annular portion 2332 is greater than the thickness of the first annular portion 2331. Therefore, in the present embodiment, the rotor space 2334 is disposed between the first annular portion 2331 and the first rotor core 231. However, the present invention is not limited to this example, and the rotor space 2334 may be disposed between the first annular portion 2331 and the second rotor core 232, or may be disposed both between the first annular portion 2331 and the first rotor core 231 and between the first annular portion 2331 and the second rotor core 232. That is, the rotor space 2334 can be disposed between the first annular portion 2331 and at least one of the first rotor core 231 and the second rotor core 232.

The rotor through hole 230 includes the first rotor through hole 2310, the second rotor through hole 2320, and the core opening 2333. When viewed from the axial direction, the core opening 2333 overlaps at least a part of the first rotor through hole 2310 and at least a part of the second rotor through hole 2320. Accordingly, by appropriately adjusting the area where the core opening 2333 and the first rotor through hole 2310 overlap each other viewed from the axial direction and the area where the core opening 2333 and the second rotor through hole 2320 overlap each other viewed from the axial direction, it is possible to adjust the supply amount of the oil CL (see FIG. 1) supplied from the axial end portion of the rotor through hole 230 to the axial end portion of the stator 25 during rotation of the rotor 21. For example, by preventing the excessive oil CL from being supplied to the axial end portion of the stator 25, the oil CL can hardly enter between the radially outer surface of the rotor 21 and the radial inner surface of the stator 25 from between the axial end portions of the rotor 21 and the stator 25. Therefore, it is possible to suppress or prevent a decrease in the rotation efficiency of the rotor 21 due to frictional resistance of the oil CL entered between the both.

The stator 25 is disposed radially outward of the rotor 21 and surrounds the rotor 21 from the outside in the radial direction. That is, the motor 2 is an inner rotor type motor in which the rotor 21 is rotatably disposed inside the stator 25. The stator 25 includes a stator core 26, a coil 27, and an insulator (not illustrated) interposed between the stator core 26 and the coil 27. The stator 25 is held by the housing 5. The stator core 26 has a plurality of magnetic pole teeth (reference numerals not illustrated) radially inward from an inner peripheral surface of an annular yoke.

A coil wire is wound between the magnetic pole teeth. The coil wire wound around a magnetic pole teeth 261 constitutes the coil 27. The coil wire is connected to the inverter unit 7 via a bus bar not illustrated. The coil 27 includes a coil end 271 protruding from the axial end surface of the stator core 26. The coil end 271 protrudes in the axial direction relative to the end portion of the rotor core 23 of the rotor 21.

Next, the gear portion 3 transmits driving force of the motor 2 to a drive shaft Ds that drives wheels of the vehicle. The drive device 1 mounted on the vehicle includes the drive shaft Ds of the vehicle. Details of the gear portion 3 will be described with reference to the drawings. As illustrated in FIG. 1 and the like, the gear portion 3 is accommodated in the gear accommodation portion 62 of the housing 5. The gear portion 3 includes a deceleration device 31 and a differential device 32.

The deceleration device 31 is connected to the motor shaft 22. The deceleration device 31 reduces the rotational speed of the motor 2, increases the torque output from the motor 2 according to the reduction ratio, and transmits the increased torque to the differential device 32.

The deceleration device 31 includes the transmission shaft 310, a first gear (intermediate drive gear) 311, a second gear (intermediate gear) 312, a third gear (final drive gear) 313, and an intermediate shaft 314. The torque output from the motor 2 is transmitted to a fourth gear 321 of the differential device 32 via the motor shaft 22, the transmission shaft 310, the first gear 311, the second gear 312, the intermediate shaft 314, and the third gear 313. The gear ratio of each gear, the number of gears, and the like can be variously changed according to the required reduction ratio. The deceleration device 31 is a parallel axis gear type deceleration device in which the axis centers of the gears are disposed in parallel. The motor shaft 22 and the transmission shaft 310 are spline-fitted.

The transmission shaft 310 extends in the Y axis direction about the rotation axis J2 and rotates about the rotation axis J2 together with the motor shaft 22. The motor shaft 22 is rotatably supported by a first gear bearing 341 and a second gear bearing 342. As described later, the first gear bearing 341 is held by the side plate portion 512 of the housing 5. The second gear bearing 342 is held by the second housing member 52 described later.

The transmission shaft 310 is a hollow shaft provided with the hollow portion 310a having an inner peripheral surface extending along the rotation axis J2 inside thereof. The end portion of the transmission shaft 310 on the −Y direction side is connected to the end portion of the motor shaft 22 on the +Y direction side as mentioned earlier. Note that the present invention is not limited to the example of the present embodiment, and the transmission shaft 310 may be the same member as the motor shaft 22, that is, may be integrated. In other words, the motor shaft 22 may be a hollow shaft extending across the motor accommodation portion 61 and the gear accommodation portion 62 of the housing 5. In this case, the +Y direction side end portion of the motor shaft 22 protrudes on the gear accommodation portion 62 side and is rotatably supported by the second gear bearing 342. The hollow portion 220 of the motor shaft 22 communicates with the first motor bearing holding portion 531 that accommodates the first motor bearing 281 and the second gear bearing holding portion 521 that accommodates the second gear bearing 342.

The first gear 311 is provided on the outer circumferential surface of the transmission shaft 310. The first gear 311 may be the same member as or a different member from the transmission shaft 310. When the first gear 311 and the transmission shaft 310 are separate members, the first gear 311 and the transmission shaft 310 are firmly fixed by shrink fitting or the like. The first gear 311 is rotatable about the rotation axis J2 together with the transmission shaft 310.

The intermediate shaft 314 extends along an intermediate axis J4 parallel to the rotation axis J2 and is rotatably supported by the housing 5 about the intermediate axis J4. Both ends of the intermediate shaft 314 are rotatably supported by a third gear bearing 343 and a fourth gear bearing 344. The third gear bearing 343 is held by the side plate portion 512 of the housing 5. The fourth gear bearing 344 is held by the second housing member 52.

The second gear 312 and the third gear 313 are provided on the outer circumferential surface of the intermediate shaft 314. The second gear 312 and the third gear 313 may be the same members as or different members from the intermediate shaft 314. When the second gear 312 and the intermediate shaft 314 are separate members, they are firmly fixed by shrink fitting or the like. When the third gear 313 and the intermediate shaft 314 are separate members, they are firmly fixed by shrink fitting or the like. The third gear 313 is disposed closer to the side plate portion 512 side than the second gear 312 (i.e., in the −Y direction).

The second gear 312 and the third gear 313 are connected to each other with the intermediate shaft 314 interposed therebetween. The second gear 312 and the third gear 313 are rotatable about the intermediate axis J4. The second gear 312 meshes with the first gear 311. The third gear 313 meshes with the fourth gear 321 of the differential device 32.

The torque of the transmission shaft 310 is transmitted from the first gear 311 to the second gear 312. The torque transmitted to the second gear 312 is transmitted to the third gear 313 via the intermediate shaft 314. The torque transmitted to the third gear 313 is transmitted to the fourth gear 321 of the differential device 32. In this manner, the deceleration device 31 transmits, to the differential device 32, the torque output from the motor 2.

The differential device 32 is attached to the drive shaft Ds. The differential device 32 transmits the output torque of the motor 2 to the drive shaft Ds. The drive shaft Ds is attached to each of the right and left sides of the differential device 32. The differential device 32 has a function of transmitting the same torque to the right and left drive shafts Ds while absorbing a speed difference between the right and left wheels (drive shaft Ds) when the vehicle turns, for example. The differential device 32 includes, for example, a fourth gear (ring gear) 321, a gear housing (not illustrated), a pair of pinion gears (not illustrated), a pinion shaft (not illustrated), and a pair of side gears (not illustrated).

The fourth gear 321 extends along the differential axis J5 parallel to the rotation axis J2, and is rotatable about a differential axis J5. Torque output from the motor 2 is transmitted to the fourth gear 321 via the deceleration device 31.

Next, the pump 4 is an electric pump driven by electricity, and is connected to the inverter unit 7 via a harness cable (not illustrated). That is, the pump 4 is driven by the inverter unit 7. As the pump 4, a trochoidal pump, a centrifugal pump, or the like can be employed. The pump 4 is provided in the pump accommodation portion 64 formed in the housing 5. For example, the pump 4 is fixed to the housing 5 with a bolt (not illustrated).

A suction port 41 of the pump 4 is inserted into a first oil passage 551 so as to close the first oil passage 551. The suction port 41 of the pump 4 is connected to a strainer 42 via the first oil passage 551 described later. The strainer 42 is disposed in the gear accommodation portion 62 of the housing 5. The strainer 42 is located in an oil pool P (see FIG. 1B and the like) of the gear accommodation portion 62 described later. The strainer 42 sucks the oil CL by drive of the pump 4 from an inlet (not illustrated) disposed on the lower surface thereof and supplies the oil CL to the suction port 41 of the pump 4. A filtration structure (not illustrated) such as a filter is attached to the strainer 42. By attaching the filtration structure, it is possible to suppress mixing of foreign matters into the pump 4 and mixing of foreign matters into the motor 2.

A discharge port 43 of the pump 4 opens to the pump accommodation portion 64. That is, the oil CL protruding from the pump 4 fills the pump accommodation portion 64. A second oil passage 552 described later is connected to the pump accommodation portion 64. The pump 4 discharges the oil CL sucked from the suction port 41 from the discharge port 43 and sends the oil CL to the oil cooler 8 via the second oil passage 552.

The oil cooler 8 performs heat exchange between the oil CL sent from the pump 4 via the second oil passage 552 and a refrigerant RE supplied in a system different from an oil passage 55 described later including the second oil passage 552. Thus, the oil cooler 8 cools the oil CL sent from the pump 4. The oil CL cooled by the oil cooler 8 is supplied to the motor 2 via a third oil passage 553 and a fourth oil passage 554 described later. The refrigerant RE is supplied to the oil cooler 8 after cooling an IGBT, an SIC element, and the like (not illustrated) of the inverter unit 7.

Figure 6:
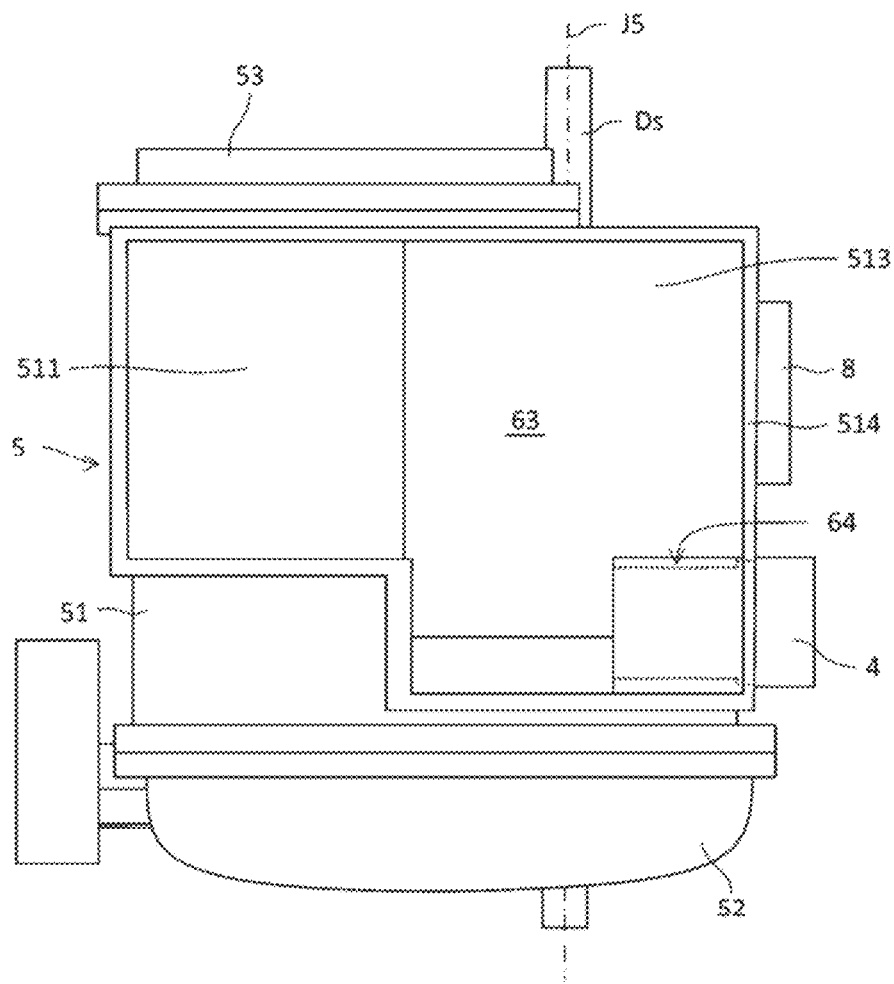
FIG. 6 is a top view of an inverter accommodation portion viewed from vertically above to vertically below.
Figure 6:
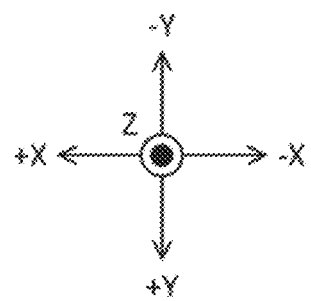

The pump accommodation portion 64 is formed in a peripheral wall portion 514 surrounding the inverter accommodation portion 63 described later (see FIG. 6). For example, the pump accommodation portion 64 can be disposed using a dead space other than the space occupied by the inverter unit 7 in the inverter accommodation portion 63. This allows the pump 4 to be compactly disposed, which can contribute to downsizing of the drive device 1.

Preferably, in the vertical direction, the pump 4 is disposed vertically below a fourth housing member 54 described later and vertically above the drive shaft Ds. Thus, the pump 4 can be disposed in an empty space between the drive shaft Ds and the fourth housing member 54 in the vertical direction. Therefore, it is possible to contribute to downsizing of the drive device 1 in the vertical direction.

Furthermore, there is no interference with an attachment portion 510 to the vehicle provided in the first housing member 51.

In the front-rear direction (i.e., the X axis direction) perpendicular to the axial direction and the vertical direction, the pump 4 and the oil cooler 8 are disposed at one end portion of the housing 5 in the front-rear direction. The motor accommodation portion 61 is disposed at a portion on the other side in the front-rear direction of the housing 5. For example, in the present embodiment, the pump 4 and the oil cooler 8 are disposed at the rear end portion (i.e., the end portion on the −X direction side) of the housing 5, and the motor accommodation portion 61 is disposed at the front portion (i.e., the +X direction side) of the housing 5. In this case, the pump 4 and the oil cooler 8 are disposed at the end portions in the front-rear direction, and it is therefore possible to suppress an increase in size of the drive device 1 in the axial direction. In addition, the pump 4 and the oil cooler 8 are provided on the housing 5 on the side opposite to the motor accommodation portion 61 in the front-rear direction, and thus the pump 4 and the oil cooler 8 can be disposed away from the motor accommodation portion 61. Therefore, the pump 4 and the oil cooler 8 can be disposed without greatly increasing the size of the drive device 1 in the front-rear direction. Furthermore, an oil passage or the like can be relatively freely disposed between the pump 4 and the oil cooler 8, and the motor accommodation portion 61.

Figure 7:
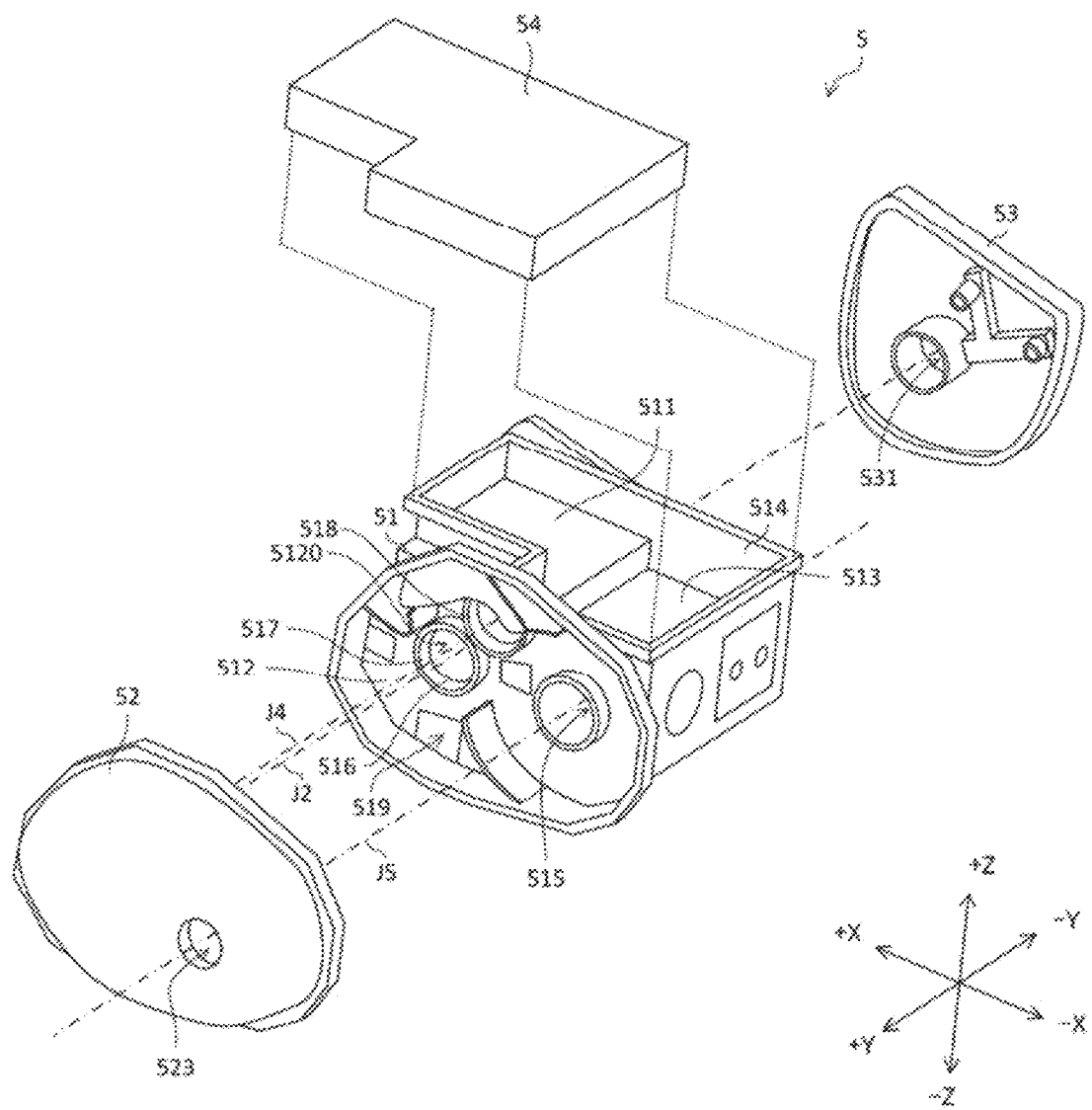
FIG. 7 is an exploded perspective view of a housing.

Next, the configuration of the housing will be described. FIG. 7 is an exploded view of the housing 5. As illustrated in FIG. 7, the housing 5 includes the first housing member 51, the second housing member 52, and the third housing member 53. The first housing member 51 includes a tubular portion 511 extending in the axial direction parallel to the rotation axis J2 and the side plate portion 512 covering one axial end portion of the tubular portion 511. The second housing member 52 is attached to one axial end portion (the end portion on the +Y direction side) of the side plate portion 512. The third housing member 53 closes the other axial end portion (the end portion on the −Y direction side) of the tubular portion 511. In other words, the third housing member 53 is disposed on the other axial side (on the −Y direction side) of the first housing member 51. That is, the third housing member 53 closes the opening of the tubular first housing member 51. The housing 5 further includes the fourth housing member 54. The fourth housing member 54 is disposed vertically above the tubular portion 511.

The housing 5 further includes the fourth housing member 54. The fourth housing member 54 is located vertically above the first housing member 51. The fourth housing member 54 is attached to the upper end portion of a peripheral wall portion 514.

The housing 5 further includes the motor accommodation portion 61 and the gear accommodation portion 62. The motor accommodation portion 61 is a space surrounded by the tubular portion 511, the side plate portion 512, and the third housing member 53, and accommodates the motor 2. The gear accommodation portion 62 is a space surrounded by the side plate portion 512 and the second housing member 52, and accommodates the gear portion 3. The motor accommodation portion 61 and the gear accommodation portion 62 are partitioned by the side plate portion 512.

The housing 5 further includes the inverter accommodation portion 63 that accommodates the inverter unit 7. The inverter accommodation portion 63 is a space surrounded by the tubular portion 511, the plate portion 513, the peripheral wall portion 514, and the fourth housing member 54. The inverter unit 7 is integrally fixed to the fourth housing member 54. That is, the inverter unit 7 is fixed downward to the inverter accommodation portion 63 by integrally fixing the inverter unit 7 to the lower side of the fourth housing member 54. The fourth housing member 54 may be provided with an inverter cooling path (not illustrated).

The housing 5 further includes the pump accommodation portion 64 that accommodates the pump 4. The pump accommodation portion 64 is formed in the first housing member 51. That is, the pump accommodation portion 64 includes the first housing member 51.

The tubular portion 511 has a tubular shape extending in the axial direction. The motor 2 is accommodated in the tubular portion 511. That is, the space inside the tubular portion 511 constitutes the motor accommodation portion 61. In the present embodiment, the tubular portion 511 and the side plate portion 512 are the identical member. However, the present invention is not limited to this example, and the tubular portion 511 and the side plate portion 512 may be different members.

The first housing member 51 further includes the plate portion 513 and the peripheral wall portion 514. The plate portion 513 expands from the tubular portion 511 along one side (+Y direction) in the right-left direction. The right-left direction is a direction perpendicular to the axial direction and intersecting the vertical direction. The peripheral wall portion 514 protrudes upward (+Z direction) from the upper end portion of the tubular portion 511 and the plate portion 513, and surrounds the inverter accommodation portion 63 when viewed from above (+Z direction) (see FIG. 6).

The first housing member 51 further includes an insertion hole 5120, a first drive shaft passage hole 515, a second motor bearing holding portion 516, a first gear bearing holding portion 517, a third gear bearing holding portion 518, and a side plate opening 519.

The insertion hole 5120 and the first drive shaft passage hole 515 are disposed in the side plate portion 512 and penetrate the side plate portion 512 in the Y axis direction. The center of the insertion hole 5120 coincides with the rotation axis J2. The second motor bearing holding portion 516 is disposed in the insertion hole 5120.

The drive shaft Ds penetrates the first drive shaft passage hole 515 in a rotatable state. A second drive shaft passage hole 523 is disposed in the second housing member 52. The second drive shaft passage hole 523 is a hole penetrating the second housing member 52 in the axial direction. The drive shaft Ds penetrates the second drive shaft passage hole 523 in a rotatable state. The second drive shaft passage hole 523 overlaps the first drive shaft passage hole 515 when viewed from the axial direction. Consequently, the drive shaft Ds disposed at both ends in the axial direction (Y direction) of the differential device 32 rotates about the differential axis J5. An oil seal (not illustrated) is provided between the drive shaft Ds and the first drive shaft passage hole 515 and between the drive shaft Ds and the second drive shaft passage hole 523 in order to suppress leakage of the oil CL. An axle (not illustrated) that rotates the wheel is connected to a front end of the drive shaft Ds.

The second motor bearing holding portion 516 extends in the −Y direction from the edge portion of the insertion hole 5120. An outer ring of the second motor bearing 282 is fixed to the second motor bearing holding portion 516. The +Y direction side end portion of the motor shaft 22 is fixed to the inner ring of the second motor bearing 282. The first bearing holding portion 531 is disposed on the +Y direction side of the third housing member 53. The central axes of the first motor bearing holding portion 531 and the second motor bearing holding portion 516 each coincide with the rotation axis J2. An outer ring of the first motor bearing 281 is fixed to the first motor bearing holding portion 531. The −Y direction side end portion of the motor shaft 22 is fixed to the inner ring of the first motor bearing 281. As a result, both ends of the rotor 21 in the Y axis direction of the motor 2 are rotatably supported by the housing 5 via the first motor bearing 281 and the second motor bearing 282.

The first gear bearing holding portion 517 extends in the +Y direction from the edge portion of the insertion hole 5120. An outer ring of the first gear bearing 341 is fixed to the first gear bearing holding portion 517. The −Y direction side end portion of the transmission shaft 310 is fixed to the inner ring of the first gear bearing 341. The second gear bearing holding portion 521 is disposed on the −Y direction side of the second housing member 52. The central axes of the second gear bearing holding portion 521 and the first gear bearing holding portion 517 coincide with the rotation axis J2. An outer ring of the second gear bearing 342 is fixed to the second gear bearing holding portion 521. The transmission shaft 310 is fixed to the inner ring of the second gear bearing 342. As a result, the transmission shaft 310 is rotatably supported by the side plate portion 512 of the housing 5 and the second housing member 52 via the first gear bearing 341 and the second gear bearing 342.

Next, the third gear bearing holding portion 518 has a tubular shape extending in the +Y direction from the side plate portion 512. The third gear bearing holding portion 518 is disposed in the +X direction and the +Z direction with respect to the first gear bearing holding portion 517. An outer ring of the third gear bearing 343 is fixed to the third gear bearing holding portion 518. The intermediate shaft 314 is fixed to the inner ring of the third gear bearing 343. The fourth gear bearing holding portion 522 is disposed on the +Y direction side of the second housing member 52. The fourth gear bearing holding portion 522 has a tubular shape extending in the −Y direction from the second housing member 52. The central axes of the third gear bearing holding portion 518 and the fourth gear bearing holding portion 522 coincide with the intermediate axis J4. An outer ring of the fourth gear bearing 344 is fixed to the fourth gear bearing holding portion 522. The +Y direction side end portion of the intermediate shaft 314 is fixed to the inner ring of the fourth gear bearing 344. As a result, the intermediate shaft 314 is rotatably supported by the side plate portion 512 of the housing 5 and the second housing member 52 via the third gear bearing 343 and the fourth gear bearing 344.

The side plate opening 519 is provided in the side plate portion 512 that partitions the motor accommodation portion 61 and the gear accommodation portion 62. The housing includes the side plate opening 519. The side plate opening 519 penetrates the side plate portion 512 in the axial direction and connects the motor accommodation portion 61 and the gear accommodation portion 62. The side plate opening 519 causes in particular the lower portion of the motor accommodation portion 61 and the lower portion of the gear accommodation portion 62 to communicate with each other. The side plate opening 519 allows the oil CL accumulated in the lower portion in the motor accommodation portion 61 to move to the gear accommodation portion 62. The oil CL having moved to the gear accommodation portion 62 can flow into the oil pool P.

Next, the configuration of the second housing member 52 will be described. The second housing member 52 is attached to the +Y direction side of side plate portion 512 of the first housing member 51. The second housing member 52 has a recessed shape that is open to the side plate portion 512 side. The opening of the second housing member 52 is covered with the side plate portion 512. As illustrated in FIG. 1 and the like, the second housing member 52 includes the second gear bearing holding portion 521, the fourth gear bearing holding portion 522, and the second drive shaft passage hole 523. Since these descriptions have been made previously, they are omitted here.

The second housing member 52 may include an oil storage portion (not illustrated) that stores the oil CL. The oil CL is supplied from the oil storage portion (not illustrated) to the second gear bearing holding portion 521 and the fourth gear bearing holding portion 522, and the oil CL is supplied to the second gear bearing 342 held by the second gear bearing holding portion 521 and the fourth gear bearing 344 held by the fourth gear bearing holding portion 522 for lubrication.

The oil pool P in which the oil CL accumulates is disposed in a lower portion in the gear accommodation portion 62. A part of the differential device 32 is immersed in the oil pool P. The oil CL accumulated in the oil pool P is scraped up by the operation of the differential device 32, and supplied to the inside of the gear accommodation portion 62. For example, the oil CL is scraped up by the tooth surface of the fourth gear 321 when the fourth gear 321 of the differential device 32 rotates. The oil CL diffused in the gear accommodation portion 62 is supplied to each gear of the deceleration device 31 and the differential device 32 in the gear accommodation portion 62 to spread the oil CL over the tooth surface of the gear, and used for lubrication. A part of the oil CL diffused in the gear accommodation portion 62 is supplied to each of the first gear bearing 341 to the fourth gear bearing 344, and used for lubrication.

Next, for example, as illustrated in FIGS. 1 to 3, the housing 5 further includes the oil passage 55 through which the oil CL flows. The oil passage 55 is a flow path through which the oil CL sucked up from the oil pool P of the gear accommodation portion 62 by the pump 4 and cooled by the oil cooler 8 flows toward the motor 2.

The oil passage 55 includes the first oil passage 551, the second oil passage 552, the third oil passage 553, and the fourth oil passage 554. The first oil passage 551, the second oil passage 552, and the third oil passage 553 are formed in the first housing member 51. The first oil passage 551 connects a lower portion of the gear accommodation portion 62 in the vertical direction and the pump accommodation portion 64. The first oil passage 551 connects a lower portion of the gear accommodation portion 62 in the vertical direction and the suction port 41 of the pump 4. The second oil passage 552 connects the pump accommodation portion 64 and the oil cooler 8. The third oil passage 553 connects the oil cooler 8 and the fourth oil passage 554. That is, the third oil passage 553 supplies the oil CL discharged from the pump 4 to the oil cooler 8. The fourth oil passage 554 is formed in the third housing member 53. The fourth oil passage 554 connects the third oil passage 553 and the motor accommodation portion 61.

Preferably, each of the first oil passage 551, the second oil passage 552, and the third oil passage 553 is formed in the first housing member 51. For example, in the present embodiment, the first oil passage 551 is formed inside the side plate portion 512, that is, formed at a different position of the same member as the side plate portion 512. Each of the second oil passage 552 and the third oil passage 553 is formed inside the peripheral wall portion 514, that is, formed at different positions of the same member as the peripheral wall portion 514. The fourth oil passage 554 is formed at different position of the same member as the third housing member 53. Accordingly, it is not necessary to dispose a pipe through which the oil CL flows outside the housing 5, and thus it is possible to prevent an increase in size of the drive device 1. Therefore, it is possible to provide the drive device 1 in which the oil passage 55 of the oil CL is compactly disposed. Each of the first oil passage 551 to the fourth oil passage 554 is drilled by a drill or an end mill.

The present invention is not limited to the example of the present embodiment, and the second oil passage 552 and the third oil passage 553 may be formed inside the plate portion 513. That is, each of the second oil passage 552 and the third oil passage 553 may be the same member as either the plate portion 513 or the peripheral wall portion 514. Thus, the second oil passage 552 and the third oil passage 553 are not separate members from the first housing member 51, and hence the number of components of the drive device 1 can be reduced. Therefore, the drive device 1 becomes easy to assemble. Furthermore, the productivity can be improved by reduction of the manufacturing cost of the drive device 1.

Preferably, the oil passage 55 further includes a connection pipe 5530. The connection pipe 5530 is disposed on an inner surface of one oil passage of the third oil passage 553 and the fourth oil passage 554 at a connection portion between the third oil passage 553 and the fourth oil passage 554, and is fitted into the other oil passage. Due to the fitting of the connection pipe 5530 at the connection portion, the third oil passage 553 and the fourth oil passage 554 can be easily positioned when the third housing member 53 is attached to the first housing member 51. Furthermore, the connection pipe 5530 covers the inside of the connection portion between the both, whereby the leakage of the oil CL at the connection portion can be more reliably prevented.

For example, in the present embodiment, in the connection portion described above, one end portion of the connection pipe 5530 is disposed on the inner surface of the third oil passage 553. The other end portion of the connection pipe 5530 is fitted into the inner surface of the fourth oil passage 554. The connection pipe 5530 is the same member as the third oil passage 553. Alternatively, one end portion of the connection pipe 5530 may be disposed on the inner surface of the fourth oil passage 554, and the other end portion may be fitted into the inner surface of the third oil passage 553. The connection pipe 5530 may be the same member as the fourth oil passage 554. However, the present invention is not limited to these examples, and the connection pipe 5530 may be a member different from the third oil passage 553 and the fourth oil passage 554.

Next, the fourth oil passage 554 is connected to an oil supply portion 558 and the hollow portion 220 of the motor shaft 22. The oil supply portion 558 is connected to the fourth oil passage 554 and supplies the oil CL to the radially outer surface of the stator 25. The drive device 1 further includes the oil supply portion 558. Specifically, the oil supply portion 558 is a tubular member extending in the axial direction. The oil supply portion 558 is accommodated in the motor accommodation portion 61 together with the motor 2 and is disposed above the stator 25. The oil supply portion 558 has a plurality of dispersion holes 5580 penetrating the inner wall. Each of the dispersion holes 5580 opens toward the stator 25 and disperses the oil CL supplied from the fourth oil passage 554 toward the stator 25. Therefore, the stator 25 can be cooled from its radially outer surface by the oil CL supplied from the oil supply portion 558.

On the other hand, the hollow portion 220 of the motor shaft 22 is connected to the rotor through hole 230 of the rotor core 23. For example, the hollow portion 220 of the motor shaft 22 is connected to the rotor through hole 230 via the recess 223, the shaft hole portion 222, and the rotor space 2334 (see FIG. 5). That is, the rotor through hole 230 is connected to the fourth oil passage 554 via the hollow portion 220. Therefore, when the rotor 21 rotates, the oil CL is supplied from the axial end portion of the rotor through hole 230 to the axial end portion of the stator 25. Thus, the axial end portion of the stator 25 can be cooled by the oil CL supplied from the rotor through hole 230, and in particular, the coil end of the stator 25 can be cooled.

The fourth oil passage 554 includes a first supply passage 555, a tubular second supply passage 556, and a tubular third supply passage 557. The first supply passage 555 is connected to the third oil passage 553. The second supply passage 556 connects the first supply passage 555 and an oil supply portion 558. The third supply passage 557 connects the first supply passage 555 and the hollow portion 220 of the motor shaft 22. That is, one end portion of the fourth oil passage 554 is the first supply passage 555, and the other end portion of the fourth oil passage 554 branches into the second supply passage 556 and the third supply passage 557. Preferably, the inner diameter of the second supply passage 556 is larger than the inner diameter of the third supply passage 557. Specifically, the minimum inner diameter of the second supply passage 556 is larger than the minimum inner diameter of the third supply passage 557. Thus, the amount of the oil CL supplied to the oil supply portion 558 can be made larger than the amount of the oil CL supplied to the hollow portion 220 of the motor shaft 22. Therefore, more oil CL can be supplied to the radially outer surface of the stator 25 than to the axial end portion of the stator 25 such as the coil end 271. Therefore, it is possible to improve the cooling efficiency of the stator 25 by the oil CL cooled by the oil cooler 8. The oil CL having cooled the motor 2 accumulates in the lower portion of the motor accommodation portion 61 and then flows to the oil pool P in the lower portion of the gear accommodation portion 62 through the side plate opening 519. That is, the oil CL supplied from the second supply passage 556 to the radially outer surface of the stator 25 via the oil supply portion 558 and having cooled the stator 25 accumulates in the lower portion of the motor accommodation portion 61, and then flows to the oil pool P in the lower portion of the gear accommodation portion 62 through the side plate opening 519. The oil CL supplied from the third supply passage 557 to the coil end 271 and the like via the rotor core through hole 230 accumulates in the lower portion of the motor accommodation portion 61, and then flows to the oil pool P in the lower portion of the gear accommodation portion 62 through the side plate opening 519.

More preferably, the inner diameter of the second supply passage 556 is larger than 1.6 times the inner diameter of the third supply passage 557. For example, in the present embodiment, the inner diameter of the second supply passage 556 is ϕ7 mm, and the inner diameter of the third supply passage 557 is ϕ5.5 mm.

Note that the above-described example does not exclude a configuration in which the inner diameter of the second supply passage 556 is equal to or smaller than the inner diameter of the third supply passage 557.

In the above embodiment, the pump accommodation portion 64 is formed in the peripheral wall portion 514. That is, the pump 4 is fixed to the peripheral wall portion 514. Similarly, the oil cooler 8 is fixed to the peripheral wall portion 514. However, the pump 4 and the oil cooler 8 may be fixed at different positions.

Figure 9:
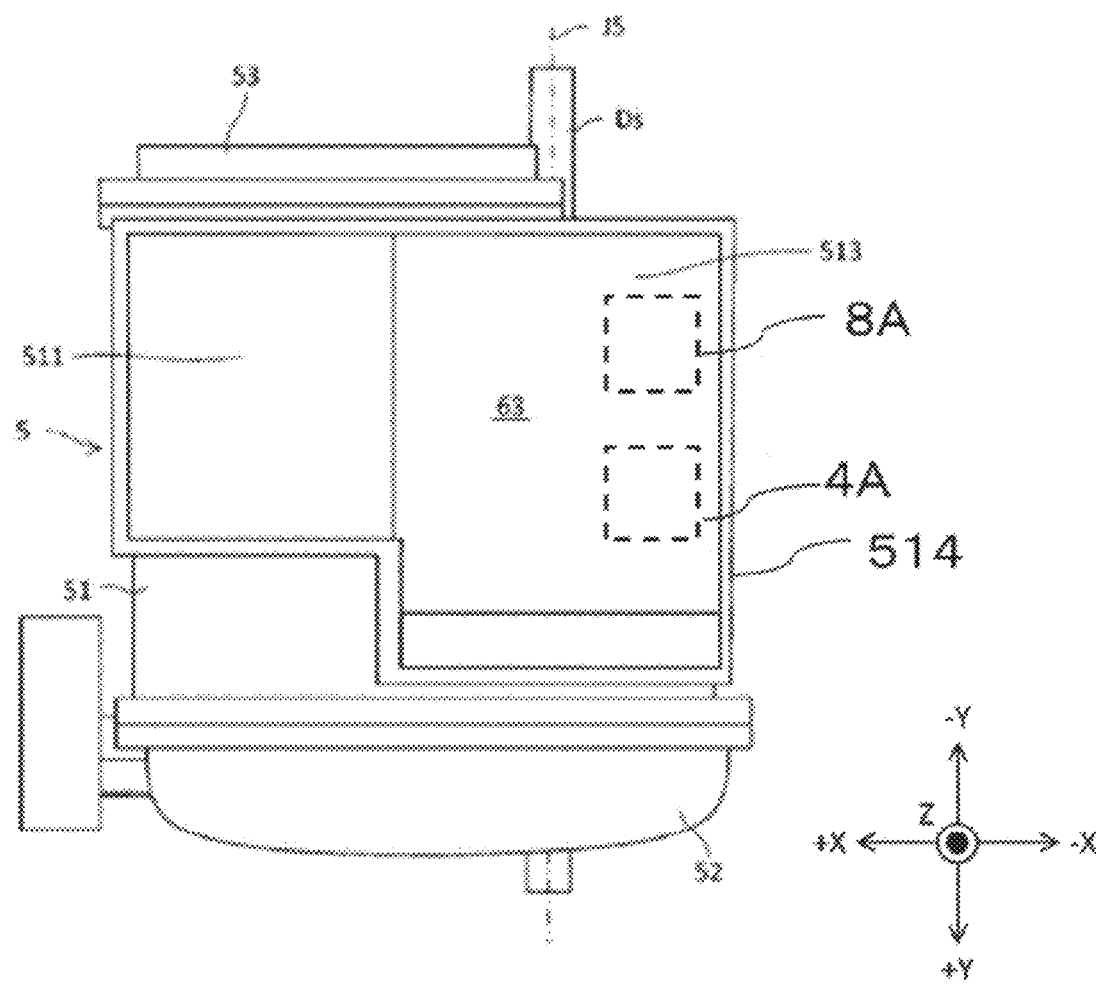
FIG. 9 is a top view of the inverter accommodation portion of a first modification according to the embodiment of the present invention as viewed from a Z axis direction.
Figure 10:
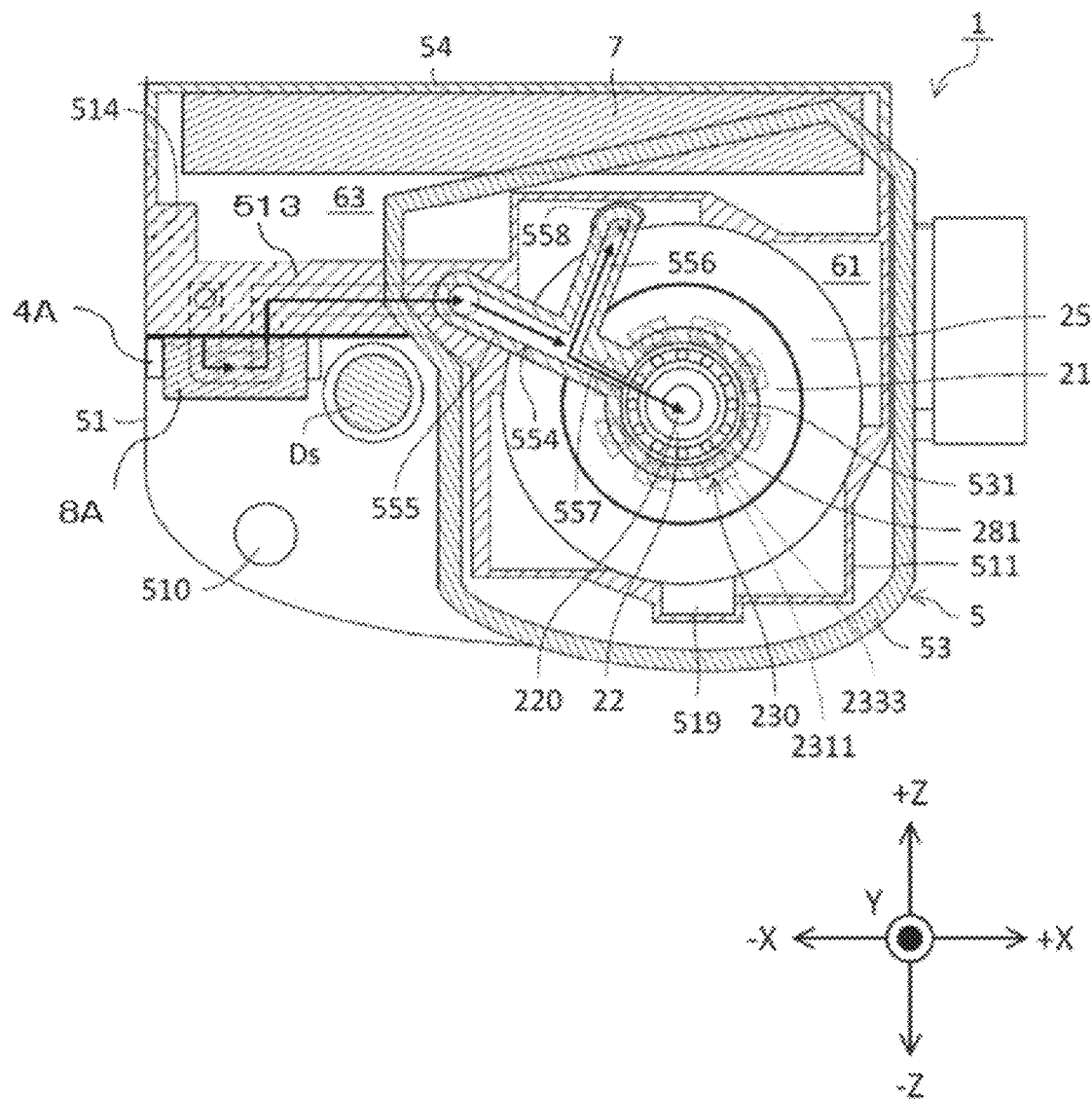
FIG. 10 is a schematic configuration view of the drive device according to the first modification according to the embodiment of the present invention as viewed from the Y axis direction.

FIGS. 9 and 10 illustrate the first modification according to an embodiment of the present invention. The configurations of FIGS. 9 and 10 are the same as those of the above-described embodiment except for the pump and the oil cooler, and the description thereof will be appropriately omitted.

The housing 5 includes the motor accommodation portion 61 that accommodates the motor 2 and an inverter accommodation portion 63 that accommodates the inverter unit 7. The motor accommodation portion 61 includes the tubular portion 511 extending in a first direction (Y axis direction). The inverter accommodation portion 63 includes the peripheral wall portion 514 surrounding the inverter accommodation portion 63 when viewed from a second direction (Z axis direction) perpendicular to the first direction (Y axis direction), and the plate portion 513 extending from the tubular portion 511 along one side in a direction (X axis direction) perpendicular to the first direction (Y axis direction) and intersecting the second direction (Z axis direction) and continuous with the peripheral wall portion 514. At least one of a pump 4A and an oil cooler 8A is fixed to the plate portion 513. More specifically, the pump 4A and the oil cooler 8A are fixed to the vertically lower side (−Z direction) of the plate portion 513. Similarly to the pump 4 described above, the pump 4A sucks up the oil CL in the oil pool P. The oil cooler 8A cools the oil CL similarly to the oil cooler 8 described above.

When viewed from the second direction (Z axis direction), the pump 4A and the oil cooler 8A are disposed at positions different from the drive shaft Ds. The pump 4A, the oil cooler 8A, and the drive shaft Ds are arranged side by side in a third direction (X axis direction) perpendicular to the first direction (Y axis direction) and the second direction (Z axis direction). In other words, the pump 4A and the oil cooler 8A are disposed at positions not overlapping the drive shaft Ds in the vertical direction (Z axis direction).

When viewed from the third direction (X axis direction), the drive shaft Ds is disposed between the pump 4A and the oil cooler 8A, and the tubular portion 511. That is, the pump 4A, the oil cooler 8A, the drive shaft Ds, and the tubular portion 511 are disposed in this order along the third direction (X axis direction).

As described above, the motor 2 is accommodated in the tubular portion 511. In addition, the plate portion 513 extends from the tubular portion along a direction perpendicular to the first direction (Y axis direction) and intersecting the second direction (Z axis direction), that is, one side in the X axis direction, and is continuous with the peripheral wall portion 514. That is, the motor 2 is not positioned on the vertically lower side of the plate portion 513 (−Z direction), and a dead space is likely to occur. According to the first modification, since the pump 4A and the oil cooler 8A are disposed in the dead space on the vertically lower side (−Z direction) of the plate portion 513, the downsizing of the drive device 1 can be efficiently realized. Note that both the pump 4A and the oil cooler 8A are not necessarily provided on the vertically lower side of the plate portion 513 (−Z direction). For example, the pump 4A may be fixed to the vertically lower side (−Z direction) of the plate portion 513, and the oil cooler 8A may be fixed to the peripheral wall portion 514. The pump 4A may be fixed to the peripheral wall portion 514, and the oil cooler 8A may be fixed to the vertically lower side (−Z direction) of the plate portion 513.

In a case where the pump 4A and the oil cooler 8A provided on the vertically lower side (−Z direction) of the plate portion 513 are arranged vertically above (+Z direction) the drive shaft Ds, the plate portion 513 needs to be sufficiently separated from the drive shaft Ds in order to avoid interference between the pump 4A and the oil cooler 8A with the drive shaft Ds, which may increase the size of the drive device 1. However, in the first modification, since the pump 4A and the oil cooler 8A are not disposed on the vertically upper side (+Z direction) of the drive shaft Ds, the plate portion 513 can be brought close to the drive shaft Ds, and the downsizing of the drive device 1 can be realized.

As illustrated in FIG. 1, the gear accommodation portion 62 accommodates at least a part of the transmission shaft 310 and at least a part of the drive shaft Ds. That is, if the transmission shaft 310 and the drive shaft Ds can be brought close to each other in the third direction (X axis direction), the gear accommodation portion 62 can be downsized in the third direction (X axis direction). As described above, the transmission shaft 310 is connected to the motor shaft 22, and extends in the Y axis direction about the rotation axis J2. According to the first modification, the drive shaft Ds and the tubular portion 511 accommodating the motor shaft 22 therein can be brought close to each other in the third direction (X axis direction). In other words, the transmission shaft 310 and the drive shaft Ds can be brought close to each other in the third direction (X axis direction). That is, the gear accommodation portion 62 can be downsized in the third direction (X axis direction).

The oil cooler 8A may be connected to an inverter cooling path (not illustrated) provided in the fourth housing member 54 by a pipe (not illustrated) disposed outside the housing 5. In this case, the refrigerant RE flows from the inverter cooling path into the pipe, and then flows into the oil cooler 8A. In this case, for example, even if the refrigerant RE leaks from the coupling portion between the oil cooler 8A and the pipe, the refrigerant RE flows to the outside of the housing 5. That is, even if the refrigerant RE leaks from the coupling portion between the oil cooler 8A and a pipe 56, the refrigerant RE can be prevented from entering the inverter accommodation portion 63. The flow of the refrigerant RE is not limited to the above, and may flow from the oil cooler 8A to the pipe and then to the inverter cooling path, for example.

Figure 11:
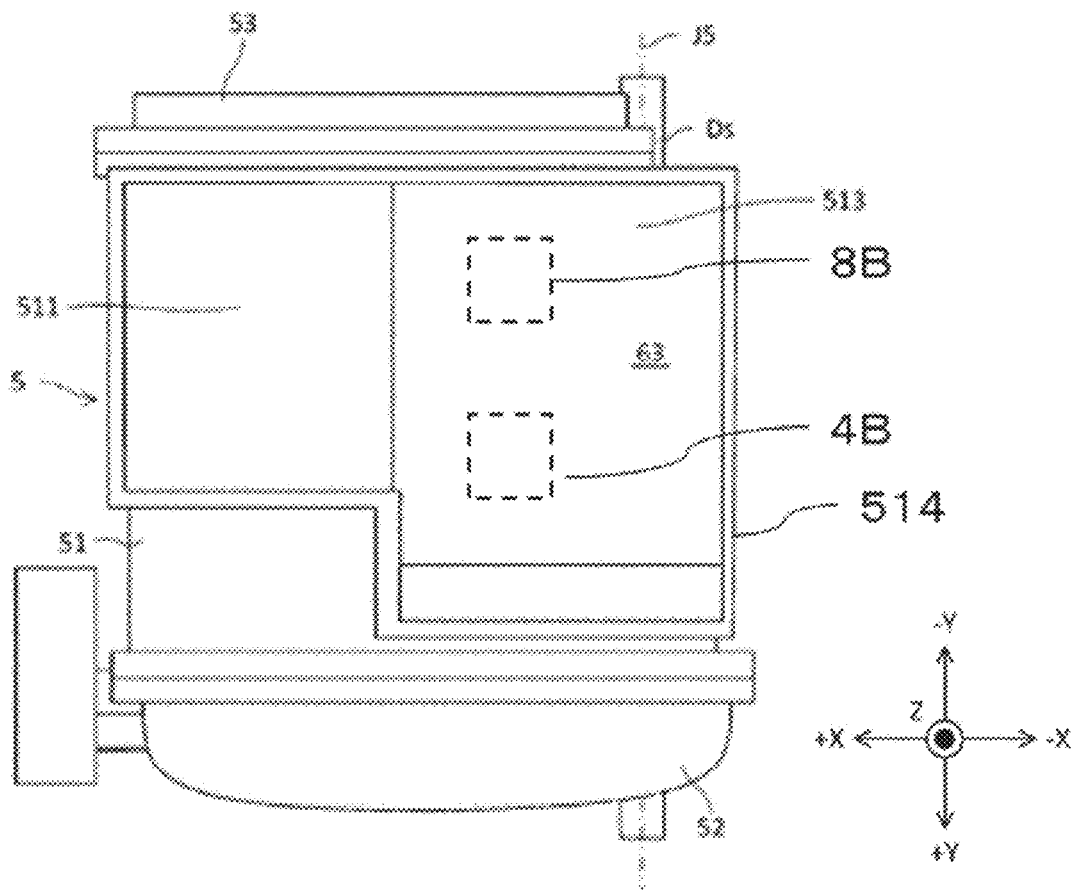
FIG. 11 is a top view of the inverter accommodation portion of a second modification according to the embodiment of the present invention as viewed from the Z axis direction.

FIG. 11 illustrates a second modification according to an embodiment of the present invention. The configuration of FIG. 11 is the same as that of the above-described embodiment except for the pump and the oil cooler, and the description thereof will be omitted.

A pump 4B and an oil cooler 8B are fixed to the vertically lower side (−Z direction) of the plate portion 513. Similarly to the pump 4 described above, the pump 4B sucks up the oil CL in the oil pool P. The oil cooler 8B cools the oil CL similarly to the oil cooler 8 described above.

As illustrated in FIG. 11, the pump 4B and the oil cooler 8B are disposed between the drive shaft Ds and the tubular portion 511 in the third direction (X axis direction). That is, the drive shaft Ds, the pump 4A, the oil cooler 8A, and the tubular portion 511 are disposed in this order along the third direction (X axis direction).

In the second modification, since the pump 4B and the oil cooler 8B are not disposed on the vertically upper side (+Z direction) of the drive shaft Ds, the plate portion 513 can be brought close to the drive shaft Ds, and the downsizing of the drive device 1 can be realized.

Figure 8:
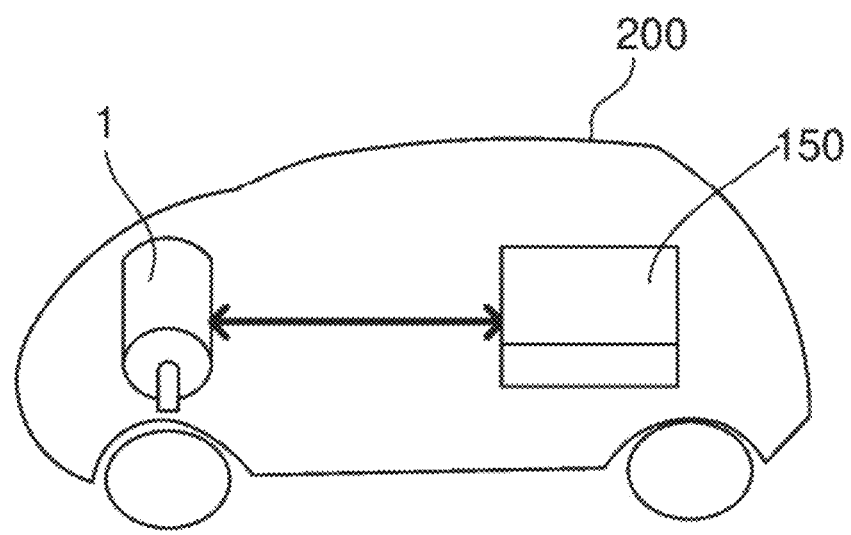
FIG. 8 is a schematic view illustrating an example of a vehicle having the drive device.

FIG. 8 is a schematic view illustrating an example of a vehicle 200 having the drive device 1. FIG. 8 conceptually illustrates the drive device 1. The vehicle 200 includes the drive device 1 and a battery 150. The battery 150 stores electric power to be supplied to the drive device 1. In the example of the vehicle 200, the drive device 1 drives the right and left front wheels. The drive device 1 is only required to drive at least any of the wheels. Such the vehicle 200 can be mounted with the drive device 1 in which the oil passage 55 of the oil CL is compactly disposed. This contributes to downsizing of the vehicle. Furthermore, since the drive device 1 can be disposed in a space-saving manner, it is possible to further expand the space in the vehicle that can be used by the passenger of the vehicle.

The embodiment of the present invention has been described above. Note that, the scope of the present invention is not limited to the above-described embodiment. The present invention can be implemented by making various modifications to the above-described embodiment without departing from the gist of the invention. In addition, the matters described in the above-described embodiment can be discretionarily combined as appropriate within a range where no inconsistency occurs.

The present invention is useful for a drive motor for a hybrid vehicle (HV), a plug-in hybrid vehicle (PHV), and an electric vehicle (EV), for example.

Features of the above-described preferred embodiments and the modifications thereof may be combined appropriately as long as no conflict arises.

While preferred embodiments of the present disclosure have been described above, it is to be understood that variations and modifications will be apparent to those skilled in the art without departing from the scope and spirit of the present disclosure. The scope of the present disclosure, therefore, is to be determined solely by the following claims.

What is claimed is:

1. A drive device comprising:
   a motor that includes a rotor having a motor shaft rotatable about a rotation axis extending along a first direction, and a stator located radially outward of the rotor;
   an inverter unit that supplies drive power to the motor;
   a housing that accommodates the motor and the inverter unit;
   a pump that supplies oil accommodated in the housing to the motor, and
   an oil cooler that cools the oil,
   wherein
   the housing includes a motor accommodation portion that accommodates the motor and an inverter accommodation portion that accommodates the inverter unit,
   the motor accommodation portion includes a tubular portion of a tubular shape extending in the first direction,
   the inverter accommodation portion includes a peripheral wall portion surrounding the inverter accommodation portion when viewed from a second direction perpendicular to the first direction, and a plate portion extending from the tubular portion along one side in a direction perpendicular to the first direction and intersecting the second direction and continuous with the peripheral wall portion, and
   at least one of the pump and the oil cooler is fixed to the plate portion.

2. The drive device according to claim 1, comprising:
   a gear portion that is connected to an end portion on one side of the motor shaft in the first direction, wherein
   the housing includes a gear accommodation portion that accommodates the gear portion, and
   the gear portion has a drive shaft connected to a wheel, the pump and the oil cooler are disposed at positions different from the drive shaft when viewed from the second direction, and the pump and the oil cooler and the drive shaft are disposed along a third direction perpendicular to the first direction and the second direction.

3. The drive device according to claim 1, wherein the drive shaft is located between the pump and the oil cooler and the tubular portion in the third direction.

4. The drive device according to claim 1, wherein the pump and the oil cooler are located between the drive shaft and the tubular portion in the third direction.

5. A vehicle comprising a drive device according to claim 1.

* * * * *